United States Patent Office 3,686,126
Patented Aug. 22, 1972

3,686,126
BLEACHING AND SOFTENING AGENT
Alfred Smeets, Tirlemont, Belgium, assignor to Citrex, S.A., Saint-Gilles-lez, Brussels, Belgium
No Drawing. Filed June 15, 1970, Ser. No. 46,471
Claims priority, application Great Britain, June 17, 1969, 30,639/69
Int. Cl. C11d 7/56
U.S. Cl. 252—99   6 Claims

ABSTRACT OF THE DISCLOSURE

The present invention provides an improved bleaching and water-softening agent in the form of a homogeneous liquid, comprising an aqueous solution containing sodium tripolyphosphate, hydrogen peroxide, an organic sequestering agent and water.

---

The present invention relates to a homogeneous liquid bleaching and water softening agent.

It has long been known to use Javel water, which is an aqueous sodium hypochlorite solution, for soaking white cloth.

It is also known, for the said use, to add to the soaking bath builders such as alkali carbonates and phosphates, which constitute powders for the said treatment, in order to facilitate the proper washing of clothes and at the same time to remove part of the staining.

At the present time, with the appearance on the market of automatic washing machines, soaking therein with Javel water with builders is attended by a certain number of disadvantages. One of these is that Javel water provides the danger of considerable corrosion of metal parts of the washing machine due to chlorine either free or in ionic form, being liberated during the soaking operation; another difficulty is the disagreeable odour and toxic properties of chlorine. Furthermore, if Javel water is not used with care, the cloth may be ruined during soaking by excessively energetic action. As for the builders, solid compositions thereof are not the best form for marketing, and it frequently happens that the salts when added do not completely dissolve in the soaking liquid, form deposits and thus produce a heterogeneous soaking liquid. Finally, soaking by such means is complicated due to the fact that it is necessary to add to the washing machine liquid Javel water, solid builders and finally solid or liquid detergents to effect the actual cleaning. Generally it is necessary to remove the soaking fluid and to rinse the cloth before proceeding with the washing, due to the fact that the chlorine of Javel water is most active against the metal parts of the washing machine at the temperatures from about 45° C. to about 100° C. usually employed for washing cloths. It is therefore an object of the present invention to provide a bleaching agent which does not have the disadvantages of Javel water and builders hereinbefore described. Other objects of the present invention will also become apparent.

The applicants have discovered that homogeneous concentrated aqueous solutions may be prepared of sodium tripolyphosphate and hydrogen peroxide, which are stable on storage, which solutions have remarkable properties as bleaching and water softening agents, in particular for soaking cloth.

The invention provides a homogeneous liquid and water softening agent containing from 14 to 60% by weight of sodium tripolyphosphate, from 1 to 30% by weight of hydrogen peroxide, from 0.1 to 10% of an organic sequestering agent and water to make up 100%, the pH of the composition being between 4.5 and 7.5.

The applicants have made the surprising discovery that the hydrogen peroxide enhances to a considerable degree the solubility of sodium tripolyphosphate in water. It is known that the solubility of sodium tripolyphosphate (hereinafter referred to as TPP) has a relatively low solubility in water; the saturation concentration thereof in water at room temperature is about 164 g./litre, corresponding to about 14% by weight. As is hereinafter demonstrated in the examples, it is possible to provide in the agent according to the invention a concentration of TPP up to 60% by weight or more.

Furthermore, as the applicant demonstrates in Example 2 aqueous solutions containing only hydrogen peroxide and TPP are not stable, probably due to the presence of traces of impurities which catalyze the decomposition of hydrogen peroxide. By the invention it is possible to overcome this disadvantage by the additional incorporation of an organic sequestering agent.

The sodium tripolyphosphate, $Na_5P_3O_{10}$, used in the agent of the invention may be in any of its crystallographic forms and in any state of hydration including the anhydrous compound $Na_5P_3O_{10}$, and the hexahydrate compound $Na_5P_3O_{10} \cdot 6H_2O$. It is used in the agent of the invention of about 14% to 60% by weight, preferably from 20 to 40% by weight, based on the total composition.

The hydrogen peroxide used in the agent of the invention may be in the form of conventional commercial aqueous solutions having an $H_2O_2$ concentration of from 5 to 50% by weight, preferably about 30% by weight. The content of hydrogen peroxide in the agent of the invention is from 1 to 30% by weight, based on 100% $H_2O_2$, preferably from 3 to 12% by weight.

The organic sequestering agent used as stabilizer in the agent of the invention must have the property of inhibiting the decomposition of the hydrogen peroxide contained in the agent. Any organic sequestering agent may be used having this property and which is sufficiently resistant to the action of the hydrogen peroxide, a preferred sequestering agent being an aminopolycarboxylic acid, such as ethylene diamine-tetracetic acid and in particular diethylene-triamine-pentacetic acid (hereinafter referred to as DPTA). The quantity of sequestering agent added to the agent according to the invention may be varied according to the intended use, between 0.1 and 10%, preferably between 0.5 and 5% by weight of the total composition.

The pH of the agent of the invention should be between 4.5 and 7.5, preferably between 5.5 and 7.0.

The agent of the invention provides a number of advantages:

(a) it combines simultaneously in a single homogeneous liquid composition a bleaching agent and a softening agent, which simplifies its use as a soaking agent,
(b) the hydrogen peroxide is a milder oxidant than sodium hypochlorite and this is of advantage in the soaking of cloth,
(c) the hydrogen peroxide also functions as a disinfectant,
(d) the TPP functioning as a softening agent for water contains heavy ions causing water hardness ($Ca^{++}$, $Mg^{++}$); and also it enhances the detergent action of the composition for the washing of cloth,
(e) the agent of the invention may without variation be used for hot washing, due to the fact that it does not contain any substances destructive to the cloth or corrosive to metal parts of the washing machine; furthermore the agent of the invention may be added without any risk to washing machines for pre-washing, and allows pre-washing and soaking to be carried out at the same time, (f) the agent of the invention is odourless and does not give off toxic constituents into the air.

As well as its usefulness as a soaking agent for cloth, the agent of the invention may also be used for other purposes, particularly for the removal of stains from plastics materials, metals, enamels, glass, porcelain and the like. It may also be used in admixture with detergents for the hygenic cleansing of premises, for example in clinics, hospitals, assembly rooms and the like.

The agent according to the invention may be prepared particularly by the following method, which is not limiting. The required quantity of organic sequestering agent is added to an aqueous solution containing a predetermined proportion of $H_2O_2$, which is cooled to about 15° C. The TPP is added to the solution at the same temperature during agitation. To achieve this effect it is necessary further to cool the solution as during the dissolution of the TPP an increase in temperature is obtained. After agitating for about 1 hour at the same temperature, the solution is filtered, the pH is adjusted with sulphuric acid preferably to a value of from 5.5 to 6.5, and the solution allowed to reach ambient temperature. The solution thereby obtained constitutes the agent according to the invention and is ready for use. When packaging the solution care should be taken that storage vessels are absolutely clean, as impurities catalyze the decomposition of the hydrogen peroxide component.

The following examples illustrate the invention without limiting the same.

EXAMPLE 1

Effect of $H_2O_2$ on the solubility of sodium tripolyphosphate

The solutions used in this example were prepared in the manner hereinbefore described.

The $H_2O_2$ content was determined by titration with iodine and arsenious acid solutions.

The TPP content was determined by two different analytical methods:

(a) determination of the amount of sodium in solution by flame photometry,
(b) determination of the amount of phosphate in solution by a colourimetric method using ammonium molybdate and ammonium monovanadate, having previously destroyed the hydrogen peroxide by means of reduction (for example potassium bisulphite).

The solutions thus prepared all contain 8 g./litre of sodium diethylene-triamine-pentacetate as stabilizer and have a pH of 6.5. It was found that the proportion of TPP dissolved in the solutions at 15° C. was a function of the $H_2O_2$ content. The results are shown in Table I.

TABLE I

| Solution No.: | $H_2O_2$ (g./litre) | $Na_5P_3O_{10}$ (g./litre) |
|---|---|---|
| 1 | 24.6 | 416 |
| 2 | 58.0 | 475 |
| 3 | 162.9 | 553 |
| 4 | 238.9 | 604 |

It is to be noted that there is a considerable solubilizing effect on TPP by the $H_2O_2$, taking into account that the solubility thereof in water under normal conditions is only 164 g./litre.

Table II shows the stability of the said solutions 1 to 4 as a function of time; the percentage of $H_2O_2$ in parentheses is the percentage of $H_2O$ initially present.

TABLE II

| | $H_2O_2$ content (g./litre) after— | | | | |
|---|---|---|---|---|---|
| | 0 day | 1 day | 14 days | 28 days | 50 days |
| Solution No.: | | | | | |
| 1 | 24.6 (100%) | 24.6 (100%) | 23.8 (96.7%) | 23.6 (95.9%) | 23.2 (94.3%) |
| 2 | 58.0 (100%) | 58.0 (100%) | 57.8 (99.7%) | 56.7 (97.8%) | 55.7 (95.2%) |
| 3 | 162.9 (100%) | 162.8 (100%) | 159.0 (98.1%) | 148.6 (91.2%) | 138.5 (85.0%) |
| 4 | 238.9 (100%) | 238.7 (100%) | 237.0 (99.2%) | 215.0 (90.0%) | 197.3 (82.6%) |

EXAMPLE 2

Effect of DTPA on the stability of $H_2O_2$ in the agent

Four solutions were prepared each containing 81.8 g./litre of $H_2O_2$ and 300 g./litre of TPP:

Solution No. 1 having a pH of 7.5
Solution No. 2 having a pH of 7.0
Solution No. 3 having a pH of 6.5
Solution No. 4 having a pH of 6.0 but containing no stabilizer (DTPA). The tests which were carried out over a total time of 42 days, are shown in the following table and are to be compared with the results shown in Table II of Example 1. It is to be seen that in the absence of DTPA the solutions of the invention are unstable:

| | Percent of initial quantity of $H_2O_2$ after— | | | | |
|---|---|---|---|---|---|
| | 0 day | 4 days | 7 days | 14 days | 42 days |
| Solution No.: | | | | | |
| 1 | 100 | 83.4 | 70.0 | 49.2 | 4.6 |
| 2 | 100 | 84.2 | 75.0 | 58.4 | 11.0 |
| 3 | 100 | 79.2 | 74.2 | 54.2 | 10.6 |
| 4 | 100 | 80.0 | 69.2 | 49.2 | 9.2 |

EXAMPLE 3

Effect of pH on th stability of $H_2O_2$ in the agent

This example shows that, for stabilizing the $H_2O_2$ in the agent, the pH should be held in the approximate range 5.5 to 7.0. The tests were carried out using solutions containing 333 g./litre of TPP, 8 g./litre of DTPA and an initial $H_2O_2$ content of 68.2 g./litre.

Solution 1: pH 7.5
Solution 2: pH 7.0
Solution 3: pH 6.5
Solution 4: pH 6.0
Solution 5: pH 5.5

In the following table, the content of $H_2O_2$ in g./litre is shown after the time indicated; the number in parentheses indicates the percentage of $H_2O_2$ remaining expressed as a percentage of the $H_2O_2$ initially present:

| | Solution Number | | | | |
|---|---|---|---|---|---|
| | 1 | 2 | 3 | 4 | 5 |
| Time in days: | | | | | |
| 0 | 68.2 (100%) | 68.2 (100%) | 68.2 (100%) | 68.2 (100%) | 68.2 (100%) |
| 3 | 66.5 (96.0%) | 68.1 (100%) | 68.1 (100%) | 67.9 (100%) | 68.0 (100%) |
| 9 | 63.8 (93.5%) | 67.4 (98.8%) | 67.7 (99.2%) | 66.5 (97.5%) | 66.5 (97.5%) |
| 20 | 62.7 (92.0%) | 66.5 (97.5%) | 66.2 (97.0%) | 64.8 (95.0%) | 65.1 (95.5%) |
| 30 | 59.7 (87.5%) | 66.1 (95.5%) | 65.9 (96.7%) | 63.8 (93.5%) | 64.2 (94.2%) |
| 42 | 56.6 (83.0%) | 64.1 (94.0%) | 64.4 (94.5%) | 62.9 (92.3%) | 63.4 (93.0%) |
| 64 | 47.1 (69.0%) | 58.9 (86.5%) | 60.7 (89.0%) | 61.7 (90.5%) | 62.4 (91.5%) |
| 113 | 37.5 (55%) | 52.2 (76.5%) | 56.2 (82.4%) | 58.3 (85.5%) | 59.7 (87.5%) |
| 130 | 35.8 (52.5%) | 48.1 (70.5%) | 54.9 (80.5%) | 56.3 (83.5%) | 58.9 (86.5%) |

EXAMPLE 4

Preferred compositions of a soaking agent according to the invention

To illustrate an agent of the invention as an agent for the soaking of cloth, reference is directed in particular to the solutions No. 1 and No. 2 of Table I of Example 1 and Solutions No. 2, No. 3, No. 4 and No. 5 of Example 3.

What I claim is:

1. A homogeneous liquid bleaching and water-softening agent in the form of an aqueous solution consisting essentially of from 14 to 60% by weight of sodium tripolyphosphate, from 1 to 30% by weight of hydrogen peroxide, from 0.1 to 10% by weight of an aminopolycarboxylic acid sequestering agent, as stabilizer for said hydrogen peroxide and water to make up 100% by weight, said aqueous solution having a pH of from 4.5 to 7.5.

2. An agent according to claim 1, wherein the aqueous solution consists essentially of from 20 to 40% by weight of sodium tripolyphosphate, from 3 to 12% by weight of hydrogen peroxide, from 0.5 to 5% by weight of organic sequestering agent as stabilizer for said hydrogen peroxide and water to make up 100% by weight.

3. An agent according to claim 1, wherein the aminopolycarboxylic acid is selected from the group consisting of sodium ethylenediamine tetracetate and sodium diethylene triamine-pentacetate.

4. An agent according to claim 1, wherein the aqueous solution has a pH of from 5.5 to 7.0.

5. An agent according to claim 1, in the form of an aqueous solution having a pH of from 5.5 to 7.0, which consists essentially of water, 24.6 grams per liter of hydrogen peroxide, 416 grams per liter of sodium tripolyphosphate and 8 grams per liter of organic sequestering agent as stabilizer for said hydrogen peroxide.

6. An agent according to claim 1, in the form of an aqueous solution having a pH of from 5.5 to 7.0, which consists essentially of water, 68.2 grams per liter of hydrogen peroxide, 333 grams per liter of sodium tripolyphosphate and 8 grams per liter of organic sequestering agent as stabilizer for said hydrogen peroxide.

References Cited
UNITED STATES PATENTS

| | | | |
|---|---|---|---|
| 2,983,568 | 5/1961 | Nerney et al. | 8—111 |
| 3,130,164 | 4/1964 | Best | 252—99 |

MAYER WEINBLATT, Primary Examiner

U.S. Cl. X.R.

8—111; 252—8.6, 99, 186